United States Patent

[11] 3,593,116

[72] Inventor Willie C. Culpepper
    Houston, Tex.
[21] Appl. No. 845,786
[22] Filed July 29, 1969
[45] Patented July 13, 1971
[73] Assignee Schlumberger Technology Corporation
    New York, N.Y.

[54] NUCLEAR MAGNETIC LOGGING APPARATUS COIL CONFIGURATION
    2 Claims, 1 Drawing Fig.
[52] U.S. Cl. .................................................. 324/0.5
[51] Int. Cl. ............................................. G01n 27/78
[50] Field of Search .......................................... 324/0.5

[56] References Cited
    UNITED STATES PATENTS
2,770,773  11/1956  Cooley ......................... 324/8
3,179,878  4/1965   Schwede ....................... 324/0.5
3,289,072  11/1966  Schuster ....................... 324/0.5

Primary Examiner—Michael J. Lynch
Attorneys—William R. Sherman, Donald H. Fidler, Stewart F. Moore and John P. Sinnott ABSTRACT: An illustrative embodiment of the invention selectively shortens the relaxation time of the signal from precessing protons observed with a nuclear magnetic logging tool. The region affected is located immediately adjacent to the formation side of the polarizing-receiving coil, thereby reducing the adverse response resulting from failure of the coil to be positioned closely against the face of the formation. This improvement is obtained through a vertical strip that contains a ferromagnetic material that is located inside of the tool housing generally coextensive with the coils.

PATENTED JUL 13 1971
3,593,116
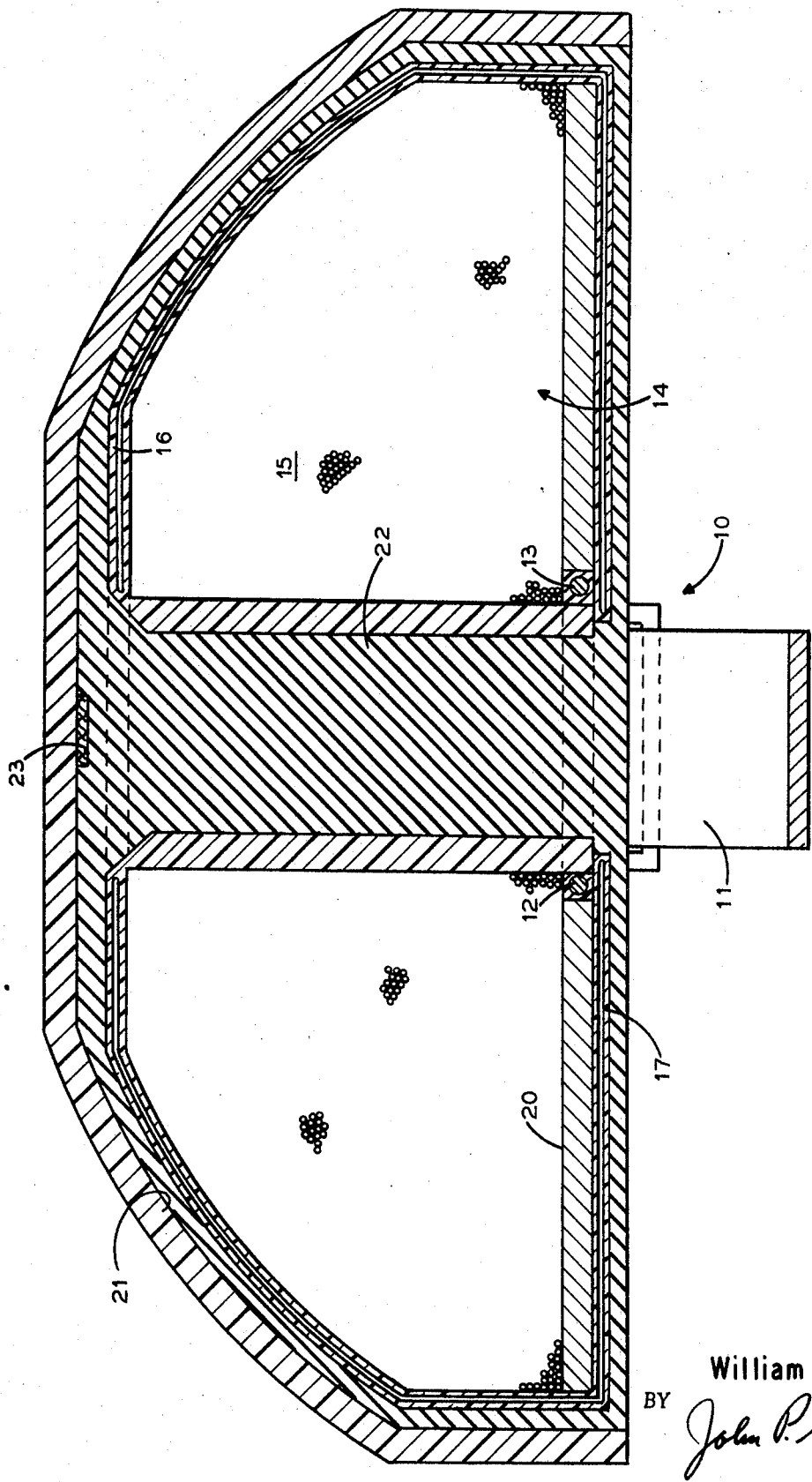
INVENTOR.
William C. Culpepper
BY John P. Sinnott
ATTORNEY

NUCLEAR MAGNETIC LOGGING APPARATUS COIL CONFIGURATION

BACKGROUND OF THE INVENTION

1. Field of the Invention

This invention relates to measuring techniques and, more particularly, to an improved nuclear magnetic logging tool for transport through a borehole and the like.

2. Description of the Prior Art

To determine the volume of fluid that can be extracted from an earth formation traversed by a borehole, tools have been proposed to measure the formation's "free fluid index." Typically, according to these suggestions, one or more large induction coils are enclosed within a fiber glass housing and drawn through a borehole. As described in more complete detail in John H. Baker, Jr. Pat. application Ser. No. 537,475 filed Mar. 25, 1966, now U.S. Pat. No. 3,483,465, granted to J. H. Baker, Jr. on Dec. 9, 1969, for "Nuclear Magnetism Logging System Utilizing an Oscillated Polarizing Field" a high intensity direct current is applied to the tool coils in order to produce a magnetic field that polarizes in one direction some of the protons in the formation liquids, the mudcake and the borehole fluid. A net magnetization is produced by the polarization of the protons. After a suitable period of polarization, the applied field is quickly reduced leaving the polarized proton to precess about the earth's magnetic field. This precession produces an oscillating magnetic field which induces an electrical signal in the coil. The desired electrical signal from the protons in the formation liquid cannot be observed immediately after termination of the polarizing current because of switching transients and signals from protons in the borehole fluid. The latter is made to decrease very rapidly by addition of a small amount of magnetite to the borehole fluid. The magnetic remanence of the small magnetite particles distorts the earth's magnetic field in the borehole and causes the protons in the borehole fluid to rapidly dephase. The more slowly decaying signal from the protons in the formation fluid can thereby be observed by measuring the signal only after a delay of 15 to 40 milliseconds after termination of the polarizing current.

The free fluid volume indication is related to the initial amplitude of the long component induced precession signal. Through extrapolation, the initial amplitude of the induced precession signal can be determined with reasonable accuracy.

Because of the physical nature of the borehole, the coil portion of the tool cannot always be positioned immediately adjacent to the formation. When this occurs, a reduced volume of formation fluid is sampled and the derived free fluid measurement is correspondingly in error. The errors resulting from this condition can be reduced if a means is employed to make the tool insensitive to response from protons located within one-half inch from the face of the coil. A thick shell of fiber glass reinforced with plastic would achieve this purpose, but the resulting increase in tool diameter limits the minimum hole diameter that can be traversed.

SUMMARY OF THE INVENTION

In accordance with an exemplary embodiment of the invention, the decay time of the signal adjacent to the logging tool is reduced by interposing a small lengthwise strip of ferromagnetic material between the coils and the borehole wall.

More specifically, a magnetic strip is interposed between the polarizing coils and the fiber glass housing of a nuclear magnetic logging tool. Preferably the strip comprises a fiber glass cloth impregnated with a mixture of magnetite and epoxy glue. A typical magnetite concentration of approximately $87.8 \times 10^3$ grams per square inch saturating a one-half inch wide strip of fiber glass cloth that is adjacent to and coextensive with the length of the coil assembly and glued to the inner surface of the housing has been quite satisfactory.

For a better understanding of the present invention, together with other and further objects thereof, reference is had to the following description taken in connection with the accompanying drawings, the scope of the invention being pointed out in the appended claims.

BRIEF DESCRIPTION OF THE DRAWING

The sole FIGURE of the drawing shows, in transverse section, an exemplary embodiment of the invention in a typical bore hole logging tool.

DESCRIPTION OF THE PREFERRED EMBODIMENTS

In the embodiment of the invention illustrated in the drawing, a logging instrument 10 is suspended for transport through a borehole (not shown) by a multiconductor cable (also not shown). Preferably, the logging instrument 10 is urged against the borehole wall by a bowspring 11.

Within the instrument 10, conductors 12 and 13 lead from polarizing coil means 14 to signal processing circuits that produce free fluid related signals (not shown) described, for example, in connection with the aforementioned Baker, Jr. patent application.

Turning once more to the logging instrument 10, the coil assembly 14 comprises a winding 15 that is vertically elongated for better field concentration. A typical height to width ratio for the winding 15 is, for example, about 3 to 1.

The outer surface of the winding 15 is covered by means of nonmagnetic cores 16 and 17 that are secured to a nonmagnetic backing plate 20. The backing plate 20 supports the entire coil means 14 and is secured to an instrument housing 22 with nonmagnetic bolts or fasteners. The bolts extend through the cores 16 and 17 and the backing plate 20. Preferably, the cores 16 and 17, the backing plate 20 and the protective outer covering or housing 22, can be made of fiber glass cloth layers laminated with an epoxy resin. As an illustrative alternative, a nonmagnetic stainless steel also provides a suitable nonmagnetic structural material. To provide a coil assembly that is watertight at the high pressures usually encountered in boreholes, the assembly 14 is covered with a layer of sealing material 21, such as rubber or neoprene.

In accordance with the invention, a lengthwise strip of ferromagnetic material 23, preferably magnetite, is applied to the logging instrument 10. It has been found, for example, that a one-half inch wide piece of fiber glass cloth as shown in the drawing, impregnated with $87.8 \times 10^{-1.13}$ grams of magnetite per square inch, if glued to the common surfaces of the protective covering 22 and the sealing material 21 substantially eliminates the effect of the proton signal from the portion of the formation that is adjacent to the sealing material. Cloth widths up to two inches and less than one-quarter inch also have produced acceptable results.

As shown, the ferromagnetic strip is glued between the fiber glass cover shell and the coil winding 15. The magnetite strip, moreover, ought to be coextensive with the vertical extent of the winding 15. Epoxy resin has been found to provide a suitable glue for both impregnating the cloth piece with magentite and for securing the "doped" cloth to the instrument.

While there have been described what are at present considered to be preferred embodiments of this invention, it will be obvious to those skilled in the art that various changes and modifications may be made without departing from the invention and it is, therefore, intended to cover all such changes and modifications as fall within the true spirit and scope of the invention.

What I claim is:

1. A borehole logging tool comprising a nonmagnetic housing for engagement with the borehole wall, coil means within said housing for producing a current in response to the magnetic field generated by protons precessing in the earth formation traversed by the borehole, a strip of fiber glass cloth about one-quarter of an inch wide coextensive with the longitudinal dimension of said coil means interposed between said coil means and said nonmagnetic housing and impregnated with magnetite for suppressing the effect of precession signals generated in the portion of the earth formation adjacent to the borehole.

2. A logging tool according to claim 1 wherein said magnetite strip is impregnated with about $87.8 \times 10^{-13}$ grams of magnetite per square inch.